(12) United States Patent
Gribb et al.

(10) Patent No.: US 12,292,391 B2
(45) Date of Patent: *May 6, 2025

(54) RE-ENTRANT CONES FOR MODERATOR CHAMBER OF A NEUTRON IMAGING SYSTEM

(71) Applicant: Phoenix, LLC, Fitchburg, WI (US)

(72) Inventors: Tye Gribb, Fitchburg, WI (US); Lucas Jacobson, Madison, WI (US)

(73) Assignee: Phoenix, LLC, Fitchburg, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/241,417

(22) Filed: Sep. 1, 2023

(65) Prior Publication Data

US 2023/0408425 A1 Dec. 21, 2023

Related U.S. Application Data

(63) Continuation of application No. 17/721,980, filed on Apr. 15, 2022, now Pat. No. 11,774,375.

(51) Int. Cl.
*G01N 23/05* (2006.01)
*G01N 23/02* (2006.01)

(52) U.S. Cl.
CPC ..... *G01N 23/025* (2013.01); *G01N 2223/204* (2013.01); *G01N 2223/316* (2013.01)

(58) Field of Classification Search
None
See application file for complete search history.

(56) References Cited

U.S. PATENT DOCUMENTS

| | | | |
|---|---|---|---|
| 3,914,612 | A | 10/1975 | Cason, Jr. |
| 4,507,553 | A | 3/1985 | Oliver |
| 4,582,999 | A | 4/1986 | Dance et al. |
| 4,599,515 | A | 7/1986 | Whittemore |
| 5,028,789 | A | 7/1991 | Whittemore |
| 5,076,993 | A | 12/1991 | Sawa et al. |
| 6,670,994 | B2 | 12/2003 | Voltz et al. |
| 6,870,894 | B2 | 3/2005 | Leung |

(Continued)

FOREIGN PATENT DOCUMENTS

| | | |
|---|---|---|
| JP | 2011-53096 | 3/2011 |
| JP | 2015-519586 | 7/2015 |

(Continued)

OTHER PUBLICATIONS

Liu Y. et al. Renovation of epithermal neutron beam for BNCT at THOR, Applied Radiation and Isotopes 61 (2004) 1039-1043.

(Continued)

*Primary Examiner* — Hoon K Song
(74) *Attorney, Agent, or Firm* — CASIMIR JONES, S.C.; Brian F. Bradley (57) ABSTRACT

A neutron imaging system that includes a central neutron source configured to produce source neutrons, wherein the central neutron source comprises a beam target, a moderator chamber surrounding at least a portion of the beam target, the moderator chamber housing a moderator, and a re-entrant cone extending into the moderator chamber. The re-entrant cone includes an entrance surface having a concave curvature facing the beam target. The entrance surface encloses a cone chamber, isolating the cone chamber from the moderator.

20 Claims, 3 Drawing Sheets

(56) References Cited

U.S. PATENT DOCUMENTS

| | | |
|---|---|---|
| 7,441,953 B2 | 10/2008 | Banks |
| 7,582,880 B2 | 9/2009 | Wallace et al. |
| 8,837,662 B2 | 9/2014 | Piefer |
| 9,024,261 B2 | 5/2015 | Piefer |
| 9,316,760 B2 | 4/2016 | Bendahan |
| 11,774,375 B1 * | 10/2023 | Gribb .................. G01N 23/025 250/390.1 |
| 2003/0178574 A1 | 9/2003 | Wallace et al. |
| 2004/0022341 A1 | 2/2004 | Leung et al. |
| 2006/0023828 A1 | 2/2006 | Mcgregor |
| 2007/0096036 A1 | 5/2007 | Kang et al. |
| 2008/0017806 A1 | 1/2008 | Norris |
| 2008/0037701 A1 | 2/2008 | Banks |
| 2009/0065713 A1 | 3/2009 | Zillmer et al. |
| 2009/0067574 A1 | 3/2009 | Johnson |
| 2010/0061500 A1 | 3/2010 | Lou et al. |
| 2010/0284502 A1 | 11/2010 | Piefer |
| 2011/0096887 A1 | 4/2011 | Piefer |
| 2012/0148134 A1 | 6/2012 | McRae et al. |
| 2012/0286164 A1 | 11/2012 | Piefer |
| 2012/0300890 A1 | 11/2012 | Piefer et al. |
| 2013/0341519 A1 | 12/2013 | Li et al. |
| 2015/0247947 A1 | 9/2015 | Bendahan |
| 2016/0042826 A1 | 2/2016 | Baldasaro |
| 2016/0163495 A1 | 6/2016 | Sherman et al. |
| 2018/0236265 A1 | 8/2018 | Mukawa et al. |

FOREIGN PATENT DOCUMENTS

| | | |
|---|---|---|
| JP | 2017-08161 | 5/2017 |
| JP | 2018-028475 | 2/2018 |
| KR | 10-2013-0046378 | 5/2013 |
| WO | WO 2013/188793 | 12/2013 |
| WO | WO 2019/200130 | 10/2019 |

OTHER PUBLICATIONS

Standard Test Method for Determining Image Quality in Direct Thermal Neutron Radiographic Examination, ASTM International, Designation: E545-14, Jun. 20, 2014, 5 pages.

Standard Test Method for the L/D Ratio of Neutron Radiography Beams, ASTM International, Designation: E803-17, at least as early as Dec. 31, 2017, 7 pages.

* cited by examiner

RE-ENTRANT CONES FOR MODERATOR CHAMBER OF A NEUTRON IMAGING SYSTEM

CROSS-REFERENCE TO RELATED APPLICATIONS

This application claims the benefit of U.S. patent application Ser. No. 17/721,980 filed on Apr. 15, 2022, which is incorporated herein by reference in its entirety.

TECHNICAL FIELD

The present disclosure relates generally to the field of neutron imaging systems (e.g., radiography and tomography systems) and methods that provide high-quality, high throughput 2D and 3D fast or thermal neutron images. Such systems and methods are useful for the commercial-scale imaging of industrial components.

BACKGROUND

Neutron radiography and tomography are proven techniques for the nondestructive testing and quality control of manufactured components in the aerospace, energy, automotive, defense, and other sectors. Like X-rays, when neutrons pass through an object, they provide information about the internal structure of that object. Neutrons are able to easily pass through many high-density materials and provide detailed information about internal materials, including many low-density materials. This property is important for a number of components that require nondestructive evaluation including jet engine turbine blades, munitions, aircraft and spacecraft components, and composite materials. Historically, commercial neutron radiography used nuclear reactors as the neutron source. Nuclear reactors are expensive, difficult to regulate, and are becoming increasingly more difficult to access, making this powerful inspection technique impractical for many commercial applications.

Accordingly, a need exists for improved neutron imaging methods and systems.

SUMMARY

According to a first aspect of the present disclosure, a neutron imaging system includes a central neutron source configured to produce source neutrons, wherein the central neutron source comprises a beam target, a moderator chamber surrounding at least a portion of the beam target, the moderator chamber housing a moderator, and a re-entrant cone extending into the moderator chamber. The re-entrant cone includes an entrance surface facing the beam target. The entrance surface encloses a cone chamber, isolating the cone chamber from the moderator. Furthermore, the entrance surface is shaped such that source neutrons produced at the beam target impinge the entrance surface with a neutron flux that varies by 10% or less along the entrance surface.

A second aspect includes the neutron imaging system of the first aspect, wherein the entrance surface of the re-entrant cone has a spherical concave curvature.

A third aspect includes the neutron imaging system of the first aspect or the second aspect, wherein a distance from the entrance surface of the re-entrant cone to a center point of the beam target varies by less than 10% along the entrance surface.

A fourth aspect includes the neutron imaging system of the first aspect or the third aspect, wherein the entrance surface of the re-entrant cone is flat.

A fifth aspect includes the neutron imaging system of any of the previous aspects, further comprising a neutron collimator extending outward from the moderator chamber, wherein the neutron collimator is coupled to the re-entrant cone such that a neutron pathway extends from the entrance surface of the re-entrant cone into the neutron collimator.

A sixth aspect includes the neutron imaging system of the fifth aspect, wherein an inner surface of the neutron collimator is lined with a neutron absorber configured to absorb a portion of the source neutrons such that the neutron collimator produces a thermal neutron imaging beam line.

A seventh aspect includes the neutron imaging system of any of the previous aspects, further comprising a neutron imaging detector, wherein the neutron imaging detector comprises a detector medium and an imaging plane.

An eighth aspect includes the neutron imaging system of the seventh aspect, wherein the detector medium comprises a film, a scintillating conversion mechanism, or a digital neutron imaging detector.

A ninth aspect includes the neutron imaging system of any of the previous aspects, wherein the central neutron source comprises a particle accelerator for generating neutrons from the beam target.

A tenth aspect includes the neutron imaging system of any of the previous aspects, wherein the re-entrant cone is one of a plurality of re-entrant cones extending into the moderator chamber in a radial array around the beam target, wherein the entrance surface of each re-entrant cone of the plurality of re-entrant cones faces the beam target.

An eleventh aspect includes the neutron imaging system of any of the previous aspects, wherein the moderator comprises heavy water and the cone chamber of the re-entrant cone is fluidly isolated from the moderator chamber.

According to a twelfth aspect of the present disclosure, a method includes producing source neutrons at a beam target of a central neutron source of a neutron imaging system, the neutron imaging system further comprising a moderator chamber surrounding at least a portion of the beam target, the moderator chamber housing a moderator and receiving source neutrons with a re-entrant cone that extends into the moderator chamber, the re-entrant cone comprising a cone chamber and an entrance surface facing the beam target, wherein the cone chamber is enclosed by the entrance surface to isolate the cone chamber from the moderator and the entrance surface of the re-entrant cone is configured such that source neutrons received with the re-entrant cone impinge the entrance surface with a neutron flux that varies by less than 10% along the entrance surface.

A thirteenth aspect includes the method of the twelfth aspect, wherein the neutron imaging system further comprises a neutron imaging detector and a neutron collimator, the neutron imaging detector comprising a detector medium and an imaging plane, the neutron collimator extends outward from the moderator chamber, and the neutron collimator is coupled to the re-entrant cone such that a neutron pathway extends from the entrance surface of the re-entrant cone into the neutron collimator and onto the neutron imaging detector.

A fourteenth aspect includes the method of the thirteenth aspect, further comprising generating a thermal neutron imaging beam line comprising source neutrons in the neutron collimator and collecting a neutron image of an object positioned at the imaging plane of the neutron imaging detector from portions of the thermal neutron imaging beam line that passes through the object.

A fifteenth aspect includes the method of the fourteenth aspect, wherein the object is an airplane part, airplane engine, munition, a product that utilizes energetic materials, a fuse, rocket, a chemically activated device, a spacecraft part, a wind turbine component, or an aerospace part.

A sixteenth aspect includes the method of the fourteenth aspect or the fifteenth aspect, wherein an inner surface of the neutron collimator is lined with a neutron absorber configured to absorb a portion of the source neutrons such that the neutron collimator produces the thermal neutron imaging beam line.

A seventeenth aspect includes the method of any of the twelfth through sixteenth aspects, wherein the central neutron source comprises a particle accelerator for generating neutrons from the beam target.

According to an eighteenth aspect of the present disclosure, a neutron imaging system includes a central neutron source configured to produce source neutrons, wherein the central neutron source comprises a particle accelerator and a beam target, wherein the beam target is configured to produce source neutrons upon impingement by a beam accelerated by the particle accelerator and propagating in a beam direction along a beam plane, a moderator chamber surrounding at least a portion of the beam target, the moderator chamber housing a moderator and a re-entrant cone extending into the moderator chamber from a chamber opening of a chamber wall of the moderator chamber, wherein the re-entrant cone comprises an entrance surface facing the beam target, the entrance surface encloses a cone chamber, isolating the cone chamber from the moderator, the chamber opening is offset from the beam plane, and the entrance surface is non-parallel the chamber wall.

A nineteenth aspect includes the neutron imaging system of the eighteenth aspect wherein the entrance surface comprises a first surface region at a location along the entrance surface closest to the beam plane and a second surface region at a location along the entrance surface farthest from the beam plane and the first surface region is nearer the chamber wall of than the second surface region.

A twentieth aspect includes the neutron imaging system of the eighteenth aspect or the nineteenth aspect wherein the entrance surface is shaped such that source neutrons produced at the beam target impinge the entrance surface with a neutron flux having a 50% or greater reduction in variability along the entrance surface compared to a variability of neutron flux along a reference region located on a reference plane that intersects a front edge of the entrance surface and is parallel the chamber wall, wherein the reference region is sized to align with the chamber opening.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Referring generally to the figures, embodiments of the present disclosure are directed to neutron imaging systems configured to generate high resolution, high throughput fast or thermal neutron images to provide viable commercial-scale thermal and fast neutron radiography. Neutron radiography and tomography are proven techniques for the nondestructive testing of manufactured components in the aerospace, energy, automotive, defense, and other sectors. Similar to X-rays, when neutrons pass through an object, they provide information about the internal structure of that object. However, X-rays interact weakly with low atomic number elements (e.g., hydrogen) and strongly with high atomic number elements (e.g., many metals). Consequently, their ability to provide information about low-density materials, particularly when in the presence of higher density materials, is poor. Neutrons do not suffer from this limitation. Neutrons pass easily through high density metals and provide detailed information about internal materials, including low density materials. Thus, neutrons can be used for non-destructive evaluation may many components that not conducive to X-rays or other nondestructive evaluation modalities, such as engine turbine blades, munitions, spacecraft components, and composite materials such as certain aerospace components and wind turbine blades.

Presently, neutron radiography and tomography are underutilized because of a lack of accessible, high flux neutron sources with the appropriate spectral characteristics. The neutron imaging systems of the present disclosure include accelerator-based neutron sources that can be used in place of a nuclear reactor or large spallation source. One challenge of accelerator-based neutron sources is that they provide several orders of magnitude lower source neutrons than a nuclear reactor. Thus, when using accelerator-based neutron source, the neutron-detecting medium is positioned nearer the neutron source than when using a nuclear reactor source. Indeed, at a nuclear reactor or large spallation source, it is typical that the detection medium can be several meters away from the neutron source, allowing for space in which to place filters to mitigate undesirable types of radiation, mainly stray gammas and fast neutrons, which will partially blur the image during acquisition. It is difficult to place such filters in an accelerator-based neutron source.

Embodiments of the present disclosure are directed to re-entrant cones positioned in a moderator chamber of a neutron imaging system which operate to mitigate this undesirable radiation while maximizing the receipt of desired thermal neutron radiation. The re-entrant cones of the present disclosure extend into a moderator chamber (e.g., a heavy water tank) to facilitate the sampling of higher thermal neutron populations closer to the target while maintaining a large volume of heavy water in the moderator chamber. Increasing the volume of heavy water increases the moderation of radiation that does not enter the re-entrant cones (i.e., is not used as part of the imaging process). The re-entrant cones include an entrance surface shaped to maximize the uniformity of the neutron flux of source neutrons generated by a neutron source. For example, the re-entrant cones can be shaped to match the nominal constant flux surfaces within the heavy water to increase neutron uniformity entering the re-entrant cone and thereafter impinging a neutron detector, leading to a higher quality and higher resolution neutron image. Embodiments of neutron imaging systems will now be described and, whenever possible, the same reference numerals will be used throughout the drawings to refer to the same or like parts.

Figure 1:
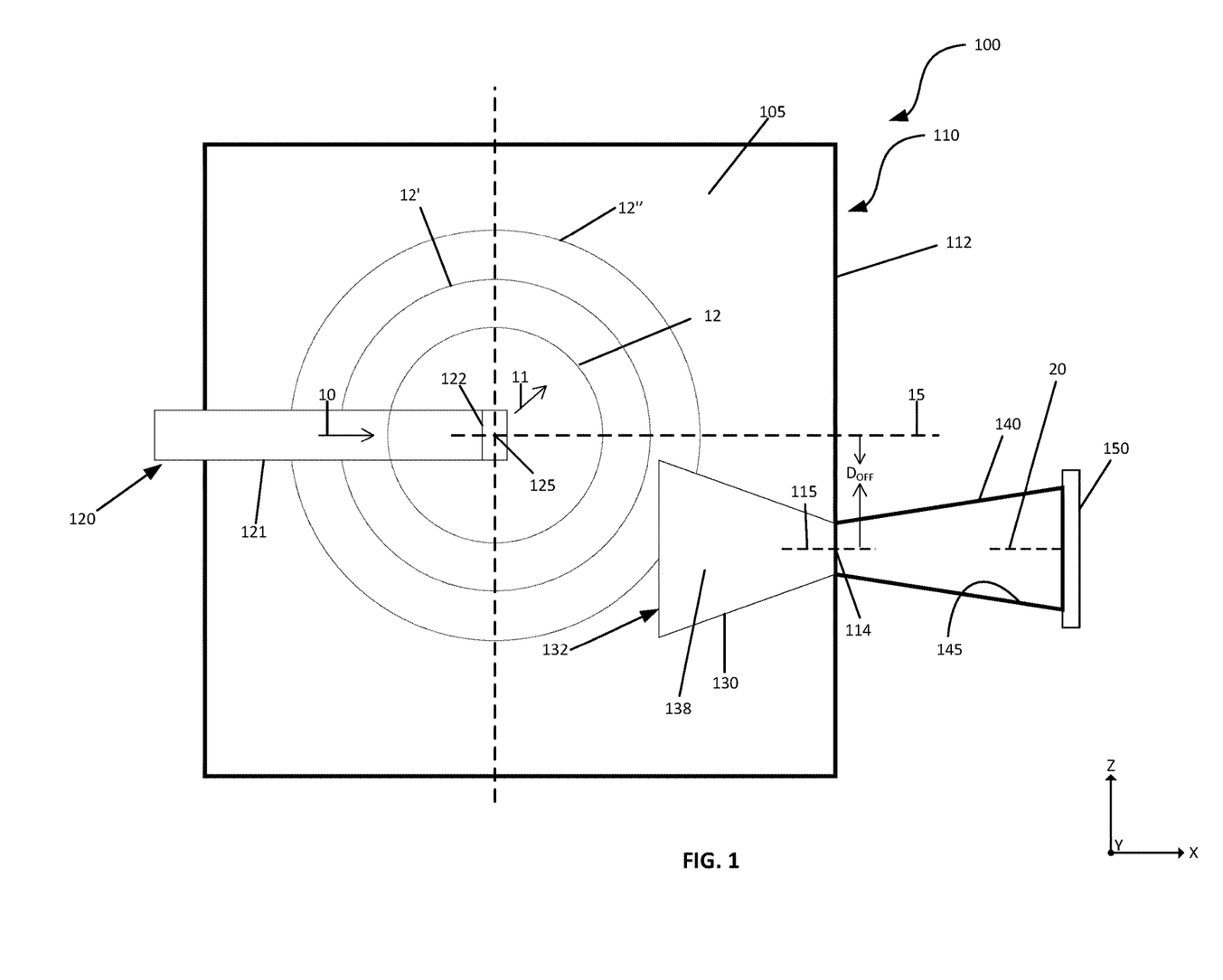
FIG. 1 schematically depicts a neutron imaging system comprising a re-entrant cone, according to one or more embodiments shown and described herein.
Figure 2:
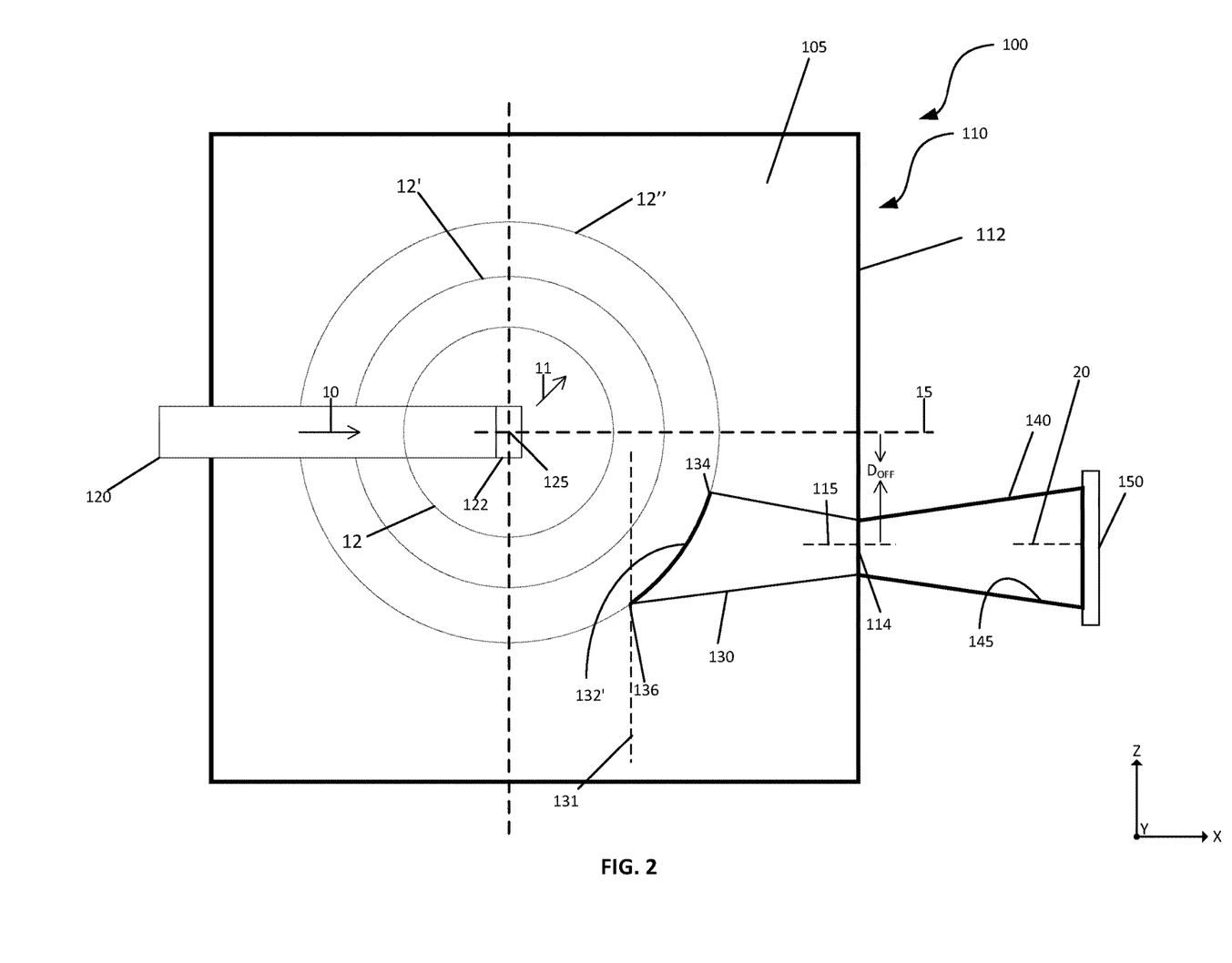
FIG. 2 schematically depicts a neutron imaging system comprising another re-entrant cone, according to one or more embodiments shown and described herein.
Figure 3:
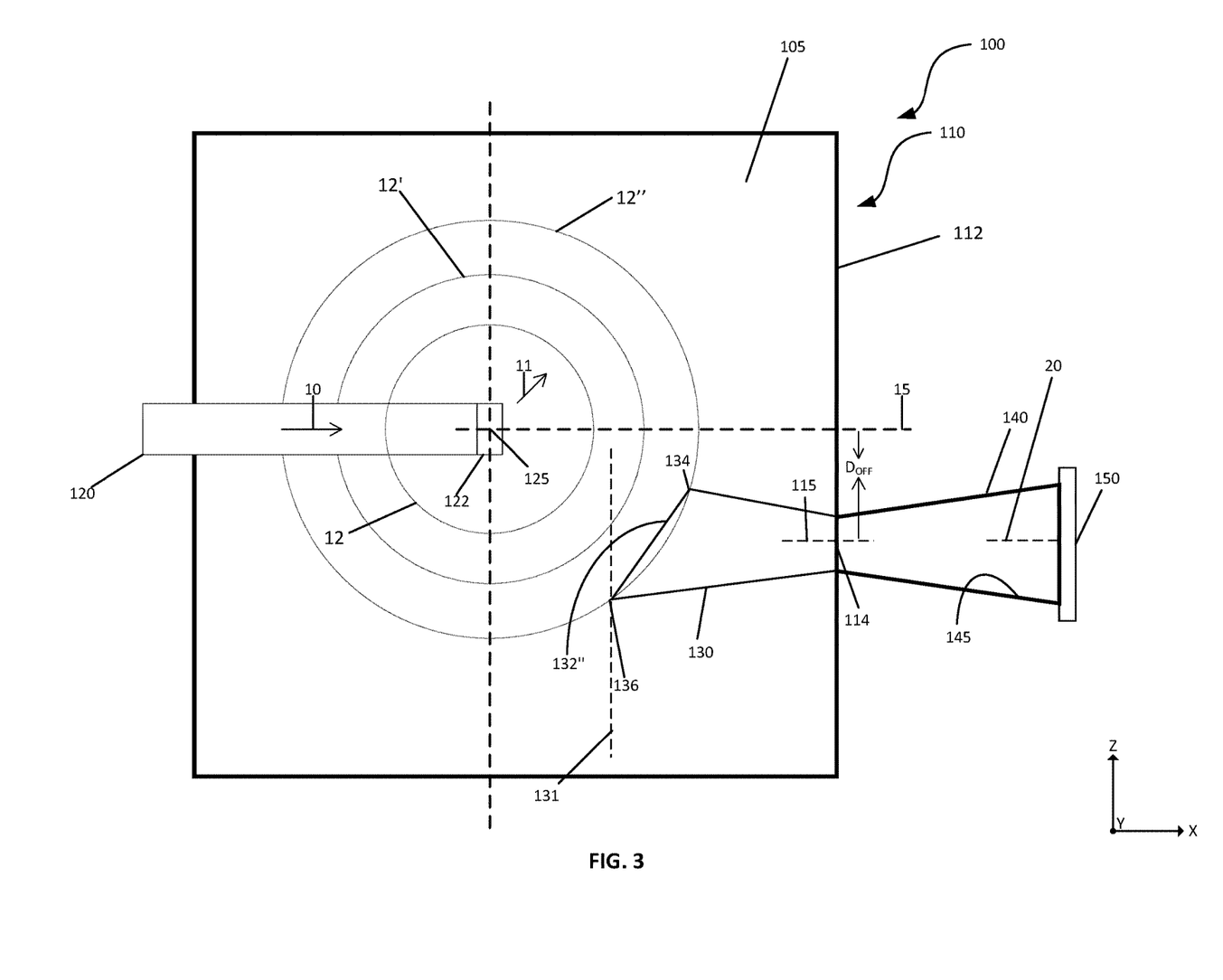
FIG. 3 schematically depicts a neutron imaging system comprising yet another re-entrant cone, according to one or more embodiments shown and described herein.

Referring now to FIGS. 1-3, a neutron imaging system 100 is schematically depicted. The neutron imaging system 100 includes a central neutron source 120 comprising a particle accelerator 121 and a beam target 122. The central neutron source 120 is configured to produce source neutrons at the beam target 122. For example, the particle accelerator 121 accelerates a beam, such as an ion beam, in a beam direction 10 along a beam plane 15. The source neutrons produced by the central neutron source 120 expand radially outward (in neutron propagation direction 11) from the beam target 122 in ring shaped patterns, as shown by neutron flux lines 12, 12', 12" in FIGS. 1-3. Using the coordinate system of FIGS. 1-3, the beam plane 15 is an X-Y plane parallel with the beam direction 10. It is contemplated that the embodiments described herein may utilize several different central neutron sources 120. For example, the central neutron source 120 may generate source neutrons by a deuterium-deuterium (DD) fusion reaction, a deuterium-tritium (DT) fusion reaction, or any other source neutron generating reactions using a particle accelerator, such as particle accelerator 121.

As depicted in each of FIGS. 1-3, the neutron imaging system 100 further comprises a moderator chamber 110 which houses a moderator 105, such as heavy water or graphite, a re-entrant cone 130 that extends into the moderator chamber 110, a neutron collimator 140 coupled to the re-entrant cone 130 at a chamber opening 114 in a chamber wall 112 of the moderator chamber 110, and a neutron imaging detector 150. The re-entrant cone 130 and the neutron collimator 140 provide a particle pathway for some of the source neutrons exiting the moderator chamber 110 to reach a neutron imaging detector 150 and image an object.

The moderator chamber 110 includes one or more chamber walls, such as chamber wall 112, which includes chamber opening 114, the opening from which the re-entrant cone 130 extends into the moderator chamber 110. In operation, the moderator 105 attenuates the source neutrons such that neutron flux reduces as the source neutrons travel away from the beam target 122 in a neutron propagation direction 11. For example, the neutron flux of source neutrons at neutron flux line 12 is greater than the neutron flux at neutron flux line 12', which is greater than the neutron flux at neutron flux line 12". The moderator 105 surrounds at least part of the beam target 122. The moderator 105 reduces the amount of gamma rays that reach the neutron imaging detector 150 and reduces the amount of radiation that reaches the one or more chamber walls.

Referring still to FIGS. 1-3, the re-entrant cone 130 extends into the moderator chamber 110 from a chamber opening 114 in the chamber wall 112. The re-entrant cone 130 provides a region that is isolated from the moderator 105 (e.g., fluidly isolated from the heavy water) such that the neutron flux of source neutrons traveling within the re-entrant cone 130 attenuates at a reduced rate compared to source neutrons propagating through the moderator 105. The re-entrant cone 130 comprises an entrance surface 132, 132' that encloses a cone chamber 138, isolating the cone chamber 138 from the moderator chamber 110. For example, when the moderator 105 comprises heavy water, the cone chamber 138 is fluidly isolated from the moderator chamber 110.

The cone chamber 138 may comprise a hollow chamber, a solid chamber (e.g., filled with a moderating material), or a chamber having hollow and filled portions. For example, hollowed portions of the cone chamber 138 promote migration of thermal neutrons towards the neutron collimator 140 and filled portions continue moderation of the radiation generated by the central neutron source 120. The hollow portions of the re-entrant cone 130 may house air or other gases and allow for relatively the same optical path length for thermal neutrons to enter the neutron collimator 140. The filled portions of the re-entrant cone 130 may be composed of materials such as water, high density polyethylene (HDPE), and graphite, for example. Moreover, the one or more re-entrant cones 130 allow for a larger moderator chamber 110 to provide increased radiation shielding without the corresponding reduction in neutron flux at the neutron imaging detector 150. The re-entrant cone 130 may comprise a tapered shape that is cylindrical or rectangular. As depicted in FIGS. 1-3, the taper is such cross-sectional shape of re-entrant cone 130 increases as the re-entrant cone 130 approaches the beam target 122.

Referring still to FIGS. 1-3, the chamber opening 114 of the chamber wall 112 is offset from the beam plane 15 (e.g., in a −Z direction of the coordinate system shown in FIGS. 1-3). For example, the chamber opening 114 comprises a centerpoint 115 and the centerpoint 115 is offset from the beam plane 15 by a distance $D_{OFF}$, offsetting the re-entrant cone 130 from the beam plane 15. Without intending to be limited by theory, the thermal neutron population of the source neutrons is significantly more uniform throughout the moderator chamber when compared to the fast neutron and gamma populations of the source neutrons. Offsetting the re-entrant cone 130 from the beam plane 15 (e.g., in a −Z direction as shown in FIGS. 1-3) offset results in the re-entrant cone 130 aiming at the region of nearly highest thermal flux but not aiming at the region of highest fast neutron and gamma flux.

Thus, offsetting the chamber opening 114 and the re-entrant cone 130 from beam plane 15 reduces the gamma flux (e.g., 2.2 MeV hydrogen capture gammas) and other high energy radiation such as neuterons, that enters the neutron collimator 140 and reaches the neutron imaging detector 150, relative to thermal neutrons, improving the resultant image quality. Moreover, the offset of the beam plane 15 from the chamber opening 114 and the re-entrant cone 130 is large enough to impede a direct light of sight from the beam target 122 to the chamber opening 114 and thus impede a direct line of sight from the beam target 122 to an imaging plane of the neutron imaging detector 150.

Referring now to FIGS. 2 and 3, the entrance surface 132' of the re-entrant cone 130 faces the beam target 122 is shaped to increase the uniformity of neutron flux entering each re-entrant cones 130, for example, in comparison to the uniformity of neutron flux entering the entrance surface 132 of FIG. 1, which is parallel to the chamber wall 112 of the moderator chamber 110. Indeed, the entrance surface 132' may be shaped to correspond with the neutron flux lines 12, 12', 12". The shape of the entrance surface 132' may be configured to align with a neutron flux distribution of source neutrons produced at the beam target 122. Increasing the uniformity of neutron flux incident across the re-entrant cone 130 increases the uniformity of the neutron flux across the field of view of the image captured using the neutron imaging detector 150, leading to a more consistent exposure across the image resulting in higher quality neutron images. The entrance surface 132' may be a curved shape, as depicted in FIG. 2, a flat shape, as depicted in FIG. 3, or a variable shape. Entrance surfaces 132' with a curved shape may have a concave curvature or a convex curvature. As one example, the entrance surface 132 comprises a spherical concave curvature. Moreover, embodiments are contemplated in which the flux lines follow a variable shape and the entrance surface 132 comprises correspondingly variable shape. This variable shape may be determined by a Monte Carlo simulation.

In operation, the re-entrant cone 130 increases the neutron flux received by the neutron imaging detector 150 compared to merely having a hole in the chamber wall 112 (e.g., the chamber opening 114) because the entrance surface 132, 132' is nearer the beam target 122 than the chamber opening 114 and has a larger surface area than the area of the chamber opening 114. While the small size of the chamber opening 114 would increase neutron flux uniformity compared to the entrance surface 132 of FIG. 1, the smaller size of the chamber opening 114 would reduce the total neutron flux that reaches the neutron imaging detector 150. In contrast, re-entrant cones 130 having the entrance surface 132' of FIGS. 2 and 3 increase the neutron flux incident on the film plane of the neutron imaging detector 150 due to the surface area and positioning of the entrance surface 132', while maintaining sufficient uniformity across the captured image due to the increased neutron flux uniformity facilitated by the shape and orientation of the entrance surface 132'.

As shown in FIGS. 2 and 3, the entrance surface 132' comprises a first surface region 134 at a location along the entrance surface 132' closest to the beam plane 15 and a second surface region 136 at a location along the entrance surface 132' farthest from the beam plane 15. The first surface region 134 is nearer the chamber wall 112 of than the second surface region 136. This orients the entrance surface 132' toward the beam target 122. Referring still to FIGS. 2 and 3, entrance surface 132' is non-parallel the chamber wall 112 (which is the wall from which the re-entrant cone 130 extends into the moderator chamber 110).

FIGS. 2 and 3 further depict a reference plane 131 that intersects a front edge of the entrance surface 132' (the front edge corresponding with the second surface region 136) and is parallel the chamber wall 112. The entrance surface 132' is shaped such that source neutrons produced at the beam target impinge the entrance surface 132' with a neutron flux having a 25% or greater reduction in variability along the entrance surface 132' compared to a variability of neutron flux along a reference region located on the reference plane 131 where the reference region is the portion of the 132' is sized to align with the chamber opening 114. For example, this reduction in variability may be 25% or greater, 30% or greater, 35% or greater, 40% or greater, 45% or greater, 50% or greater, 55% or greater, 60% or greater, 70% or greater, 80% or greater, 90% or greater, 95% or greater, 99% or greater, or a value in a range having any two of these values as endpoints.

In some embodiments, a distance from the entrance surface 132' of the re-entrant cone 130 to a beam target centerpoint 125 of the beam target 122 varies by 20% or less along the entrance surface 132, for example, by 18% or less, 15% or less, 12% or less, 10% or less, 9% or less, 8% or less, 7% or less, 6% or less, 5% or less, 4% or less, 3% or less, 2% or less, 1.5% or less, 1% or less, 0.5% or less, 0.1% or less, or the like. In some embodiments, the entrance surface 132' is shaped such that source neutrons produced at the beam target 122 impinge the entrance surface 132 with a neutron flux that varies by 20% or less along the entrance surface 132, for example, by 18% or less, 15% or less, 12% or less, 10% or less, 9% or less, 8% or less, 7% or less, 6% or less, 5% or less, 4% or less, 3% or less, 2% or less, 1.5% or less, 1% or less, 0.5% or less, or less, or a value in a range having any two of these values as endpoints.

Referring again to FIGS. 1-3, the re-entrant cone 130 provides a pathway for source neutrons to exit the moderator chamber 110 and enter the neutron collimator 140. The neutron collimator 140 provides a particle pathway for some of the source neutrons exiting the moderator chamber 110 to reach the neutron imaging detector 150. The neutron collimator 140 extends outward from the moderator chamber 110. The neutron collimator 140 is coupled to the re-entrant cone 130 and the chamber opening 114. Thus, a neutron pathway extends from the entrance surface 132, 132' of the re-entrant cone 130 into the neutron collimator 140. An inner surface 145 of the neutron collimator 140 is lined with a neutron absorber configured to absorb a portion of the source neutrons and produce a thermal neutron imaging beam line 20, for example, from thermal neutrons of the source neutrons. This thermal neutron imaging beam line 20 impinges the neutron imaging detector 150 to image an object. In some embodiments, the neutron absorber positioned along the inner surface 145 of the one or more neutron collimators 140 is selected from the group consisting of: cadmium, boron and boron-containing compounds, lithium and lithium-containing compounds, gadolinium, and composites containing any of these materials.

Referring still to FIGS. 1-3, the neutron imaging detector 150 comprises a detector medium and an imaging plane. The detector medium may comprise a film (e.g., a radiographic film), a scintillating conversion mechanism, a storage phosphor, a direct conversion screen, an amorphous silicon flat panels, a microchannel plate, a digital detector array, and/or an indirect conversion screen. In some embodiments, the neutron imaging detector 150 is a non-planar neutron detector that conforms to the contour of the object to be imaged to minimize the blurring effect from a thermal neutron imaging beam line 20 that is non-parallel with the object. In such instances, the non-planar detector may comprise film or digital media, such as scintillating material coupled to light transmitting, converting, multiplying, and/or detector elements such as fiber optic guides and photomultiplier tubes. While not depicted, in some embodiments the neutron imaging system 100 may further comprise neutron focusing and/or reflecting elements which are configured to increase neutron flux at the imaging plane of the neutron imaging detector 150 to increase image resolution.

An imaging operation using the neutron imaging system 100 includes producing source neutrons at the beam target 122, receiving source neutrons with the re-entrant cone 130 such that source neutrons enter the neutron collimator 140, generating a thermal neutron imaging beam line 20 in the neutron collimator 140, and collecting a neutron image of an object positioned at the imaging plane of the neutron imaging detector 150 from portions of the thermal neutron imaging beam line 20 that pass through the object, thereby generating a neutron image. In some embodiments, the object is an airplane part (e.g., wings), airplane engine, munition, a product that utilizes energetic materials, a fuse, rocket, a chemically activated device, a spacecraft part, a wind turbine component, (e.g., a composite part), or an aerospace part.

The neutron imaging techniques described herein may be combined with other nondestructive evaluation techniques, including X-ray radiography and tomography, to create fusion image data sets that provide more information than a standalone neutron image or x-ray image. Other nondestructive evaluation techniques that provide 2D and 3D information about a component that may be fused with the neutron image include ultrasound, magnetic resonance, magnetic penetrant, thermography, x-ray fluorescence, and small angle neutron scattering, amongst others. In such cases, image registration software may be used to correlate data from two or more nondestructive evaluation techniques to create a fusion image data set.

Referring again to FIGS. 1-3, while a single re-entrant cone 130 and single neutron collimator 140 are depicted for ease of understanding the concepts described herein, it should be understood that embodiments are contemplated comprising a plurality of re-entrant cones extending into the moderator chamber, for example, in a radial array around the beam target 122. In such embodiments, each of the plurality of re-entrant cones may comprise the entrance surface 132' described herein oriented at the beam target and each may be coupled to a corresponding neutron collimator. Moreover, the plurality of re-entrant cones may extend into the moderator chamber 110 in a radial array along a common plane, for example, a common X-Y plane passing through the centerpoint 115 of the chamber opening 114, offset from the beam plane 15, for example, offset along the Z-axis as depicted in FIGS. 1-3.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical values or idealized geometric forms provided. Accordingly, these terms should be interpreted as indicating that insubstantial or inconsequential modifications or alterations of the subject matter described and claimed are considered to be within the scope of the disclosure as recited in the appended claims.

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

What is claimed is:

1. A neutron imaging system comprising:
   a central neutron source configured to produce source neutrons, wherein the central neutron source comprises a beam target;
   a moderator chamber surrounding at least a portion of the beam target, the moderator chamber housing a moderator; and
   a re-entrant cone extending into the moderator chamber, wherein:
      the re-entrant cone comprises an entrance surface having a concave curvature facing the beam target; and
      the entrance surface at least partially defines a cone chamber, isolating the cone chamber from the moderator.

2. The neutron imaging system of claim 1, wherein the entrance surface of the re-entrant cone has a spherical concave curvature.

3. The neutron imaging system of claim 1, wherein a distance from the entrance surface of the re-entrant cone to a center point of the beam target varies by less than 10% along the entrance surface.

4. The neutron imaging system of claim 1, wherein the entrance surface is shaped such that source neutrons produced at the beam target impinge the entrance surface with a neutron flux that varies by 20% or less along the entrance surface.

5. The neutron imaging system of claim 1, further comprising a neutron collimator extending outward from the moderator chamber, wherein the neutron collimator is coupled to the re-entrant cone such that a neutron pathway extends from the entrance surface of the re-entrant cone into the neutron collimator.

6. The neutron imaging system of claim 5, wherein an inner surface of the neutron collimator is lined with a neutron absorber configured to absorb a portion of the source neutrons such that the neutron collimator produces a thermal neutron imaging beam line.

7. The neutron imaging system of claim 1, further comprising a neutron imaging detector, wherein the neutron imaging detector comprises a detector medium and an imaging plane.

8. The neutron imaging system of claim 7, wherein the detector medium comprises a film, a scintillating conversion mechanism, or a digital neutron imaging detector.

9. The neutron imaging system of claim 1, wherein the central neutron source comprises a particle accelerator for generating neutrons from the beam target.

10. The neutron imaging system of claim 1, wherein the re-entrant cone is one of a plurality of re-entrant cones extending into the moderator chamber in a radial array around the beam target, wherein the entrance surface of each re-entrant cone of the plurality of re-entrant cones faces the beam target.

11. The neutron imaging system of claim 1, wherein the moderator comprises heavy water and the cone chamber of the re-entrant cone is fluidly isolated from the moderator chamber.

12. A method comprising
producing source neutrons at a beam target of a central neutron source of a neutron imaging system, the neutron imaging system further comprising a moderator chamber surrounding at least a portion of the beam target, the moderator chamber housing a moderator; and
receiving source neutrons with a re-entrant cone that extends into the moderator chamber, the re-entrant cone comprising a cone chamber and an entrance surface having a concave curvature facing the beam target, wherein:
the cone chamber is at least partially defined by the entrance surface to isolate the cone chamber from the moderator.

13. The method of claim 12, wherein:
the neutron imaging system further comprises a neutron imaging detector and a neutron collimator;
the neutron imaging detector comprising a detector medium and an imaging plane;
the neutron collimator extends outward from the moderator chamber; and
the neutron collimator is coupled to the re-entrant cone such that a neutron pathway extends from the entrance surface of the re-entrant cone into the neutron collimator and onto the neutron imaging detector.

14. The method of claim 13, further comprising:
generating a thermal neutron imaging beam line comprising source neutrons in the neutron collimator; and
collecting a neutron image of an object positioned at the imaging plane of the neutron imaging detector from portions of the thermal neutron imaging beam line that passes through the object.

15. The method of claim 14, wherein the object is an airplane part, airplane engine, munition, a product that utilizes energetic materials, a fuse, rocket, a chemically activated device, a spacecraft part, a wind turbine component, or an aerospace part.

16. The method of claim 14, wherein an inner surface of the neutron collimator is lined with a neutron absorber configured to absorb a portion of the source neutrons such that the neutron collimator produces the thermal neutron imaging beam line.

17. The method of claim 12, wherein the central neutron source comprises a particle accelerator for generating neutrons from the beam target.

18. A neutron imaging system comprising:
a central neutron source configured to produce source neutrons, wherein the central neutron source comprises a beam target;
a moderator chamber surrounding at least a portion of the beam target, the moderator chamber housing a moderator; and
a re-entrant cone extending into the moderator chamber, wherein:
the re-entrant cone comprises an entrance surface facing the beam target;
the entrance surface at least partially defines a cone chamber, isolating the cone chamber from the moderator; and
the entrance surface is shaped such that source neutrons produced at the beam target impinge the entrance surface with a neutron flux that varies by 20% or less along the entrance surface.

19. The neutron imaging system of claim 18, wherein the entrance surface of the re-entrant cone has a concave curvature.

20. The neutron imaging system of claim 18, wherein a distance from the entrance surface of the re-entrant cone to a center point of the beam target varies by less than 20% along the entrance surface.

* * * * *